United States Patent
Laroia et al.

(10) Patent No.: US 6,708,040 B1
(45) Date of Patent: Mar. 16, 2004

(54) LINK LEVEL SUPPORT OF WIRELESS DATA

(76) Inventors: Rajiv Laroia, 455 Somverville Rd., Basking Ridge, NJ (US) 07920; Junyi Li, Matawan Terrace Apartments, Apt. 104, Matawan, NJ (US) 07747; Sathyadev Venkata Uppala, 281 Spruce Mill La., Scotch Plains, NJ (US) 07076

( * ) Notice: Subject to any disclaimer, the term of this patent is extended or adjusted under 35 U.S.C. 154(b) by 480 days.

(21) Appl. No.: 09/596,817

(22) Filed: Jun. 19, 2000

(51) Int. Cl.⁷ .............................. H04B 7/00; H04Q 7/20
(52) U.S. Cl. ..................... 455/515; 455/434; 455/458
(58) Field of Search ............................. 455/509, 515, 455/434, 435, 450, 455, 458; 340/7.48, 7.22, 7.21, 7.59

(56) References Cited

U.S. PATENT DOCUMENTS

| | | | |
|---|---|---|---|
| 4,815,073 A | | 3/1989 | Grauel et al. |
| 5,517,673 A | * | 5/1996 | Fehnel ........................ 455/434 |
| 5,577,024 A | | 11/1996 | Jokinen et al. |
| 5,854,980 A | | 12/1998 | Takahashi et al. |
| 5,963,869 A | * | 10/1999 | Fehnel ........................ 455/511 |
| 6,049,711 A | * | 4/2000 | Ben-Yehezkel et al. ..... 455/414 |
| 6,188,910 B1 | * | 2/2001 | Park et al. .................. 455/509 |
| 6,356,767 B2 | * | 3/2002 | Froula ........................ 455/512 |
| 6,389,284 B1 | * | 5/2002 | Cook et al. ................. 455/434 |

FOREIGN PATENT DOCUMENTS

EP  0419244 A2  3/1991

OTHER PUBLICATIONS

European Search Report, 3 pages, Oct. 1, 2001.

* cited by examiner

Primary Examiner—Charles Appiah
Assistant Examiner—Tsuleun R. Lei

(57) ABSTRACT

In a wireless communication system, mobile unit and base station access request and page transmissions are addressed by employing an efficient unified approach for the transmission and detection of both access requests from a mobile unit and pages from a base station. To this end, a mobile unit monitors for access requests and monitors a prescribed resource to detect if a page has been received. Upon detection of an access request, a corresponding request message is generated and transmitting substantially immediately to a base station, thereby minimizing latency in the access process. Concurrently, a base station monitors to determine if a page indication has been received and monitors a prescribed resource to determine if an access request message has been received. In this process, the processing of request messages takes precedence over the processing of pages. Upon detecting a received request message a request response message is generated and transmitted substantially immediately to the mobile unit, thereby also minimizing latency in the access process.

65 Claims, 6 Drawing Sheets

LINK LEVEL SUPPORT OF WIRELESS DATA

RELATED APPLICATION

U.S. patent application Ser. No. 09/596434 was filed concurrently herewith.

TECHNICAL FIELD

This invention relates to wireless communications systems and, more particularly, to wireless communications between mobile units and base stations.

BACKGROUND OF THE INVENTION

The basic mechanism in wireless communication systems for a base station and one or more mobile units to communicate is to exchange messages by utilizing a so-called segment. One such wireless system is the Orthogonal Frequency Division Multiplex (OFDM) system. A segment, as shown in FIG. 2 and further described below, is a combination of a time slot index and a waveform index. A time slot is a basic time unit having a unique time slot index associated with it. During any particular time slot interval there could be several waveforms that are transmitted and received that may or may not be orthogonal. Each waveform has a unique waveform index. Messages of particular interest in wireless communication systems are mobile unit requests on an uplink and base station pages on a downlink.

Typically, a mobile unit can tolerate delays in receiving a page message from a base station. However, a mobile unit when transmitting a request, must convey the request to the base station and receive a request response message as soon as possible to keep latency to a minimum.

SUMMARY OF THE INVENTION

Problems and limitations related to prior wireless communication system mobile unit and base station access request and page transmissions are addressed by employing an efficient unified approach for the transmission and detection of both access requests from a mobile unit and pages from a base station.

To this end, a mobile unit monitors for access requests and monitors a prescribed resource to detect if a page has been received. Upon detection of an access request, a corresponding request message is generated and transmitting substantially immediately to a base station, thereby minimizing latency in the access process. Concurrently, a base station monitors to determine if a page indication has been received and monitors a prescribed resource to determine if an access request message has been received. In this process, the processing of request messages takes precedence over the processing of pages. Upon detecting a received request message a request response message is generated and transmitted substantially immediately to the mobile unit, thereby also minimizing latency in the access process.

More specifically, the mobile unit monitors prespecified signal assignment (A) segments for page messages from a base station. Upon receiving a page message, the mobile unit transmits an appropriate acknowledgment message to the base station and then performs the action specified in the received page message. If an access request is received, a request message is generated and transmitted to the base station substantially immediately in a request (R) segment in a time slot dedicated to the particular mobile unit. Then, the mobile unit monitors all received A-segments for a request response message from the base station. Upon receiving the request response message an appropriate acknowledgment message is transmitted in an ACK-segment to the base station. Then, the mobile unit performs the action specified in the received request response message. The mobile unit simultaneously monitors for both the page messages and the access requests and the processing of access requests takes precedence over processing of received page messages.

In a base station, if a page indication is received an appropriate page message is transmitted in an assigned A-segment to the mobile unit. Upon receiving a corresponding acknowledgment message from the mobile unit, the base station performs the action specified in the page message. If an access request message is detected in assigned R-segments, the base station generates and transmits substantially immediately an appropriate request response message to the mobile unit. Then, upon receiving an appropriate acknowledgment message from the mobile unit, the base station performs the action specified in the received request message. The base station simultaneously monitors for both the request messages and the pages and processing of received access request messages takes precedence over processing of page indications.

Thus, applicants' unique invention employs this unified technique to address both the page and access request processes that balances their divergent requirements.

DETAILED DESCRIPTION

Figure 1:
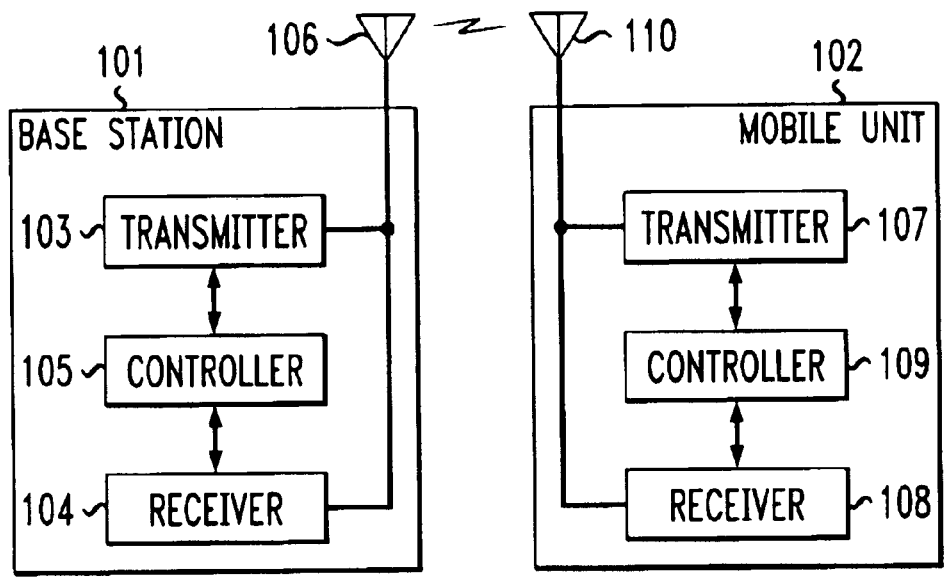
FIG. 1 shows, in simplified block diagram form, details of a base station and a mobile unit in which the invention may be employed.

FIG. 1 shows, in simplified block diagram form, details of a base station and a mobile unit in which the invention may be employed. Specifically, shown are base station 101 and mobile unit 102. It is noted that only a single mobile unit 102 is shown but, typically, a set including a number of mobile units, shares a base station 101. In this example, base station 101 includes transmitter 103, receiver 104 and controller 105 for transmitting and receiving wireless messages via antenna 106. Controller 105 is employed to control operation of transmitter 103 and receiver 104, in accordance with the invention. Similarly, in this example, mobile unit 102 includes transmitter 107, receiver 108 and controller 109 for transmitting and receiving wireless messages via antenna 110. Controller 109 is employed to control operation of transmitter 107 and receiver 108, in accordance with the invention.

Figure 2:
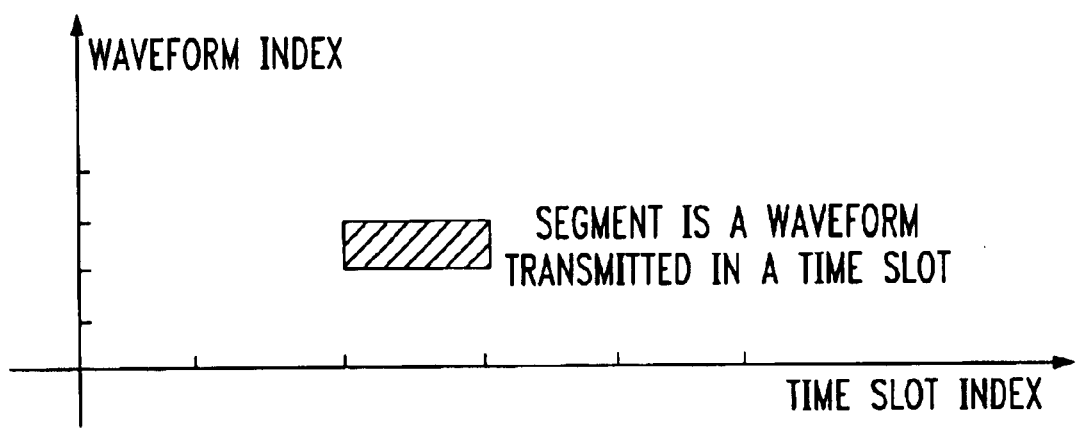
FIG. 2 is a graphical representation of a segment useful in describing the invention.

FIG. 2 is a graphical representation of a segment useful in describing the invention. As indicated above, the basic mechanism in wireless communication systems for a base station 101 and one or more mobile units 102 to communicate is to exchange messages by utilizing a so-called segment. A time slot is a basic time unit and associated with it is a unique time slot index. During any particular time slot there could be one or more waveforms that are transmitted or received. Each of the waveforms has a unique waveform index. A segment is defined as being a combination of a time slot index and waveform index. Base station 101 or mobile unit 102 transmits or receives messages by utilizing segments. The size of the time slot and specific waveforms carried therein could vary depending on the particular message, i.e., whether the message is a request (R), request response (RR), page (PG), or an acknowledgment (ACK). The waveforms carried in any particular time slot could be orthogonal, i.e., waveforms that do not interfere with one another. It is noted that the choice of orthogonal waveforms could reduce interference between mobile units transmitting in the same time slot.

Figure 3:
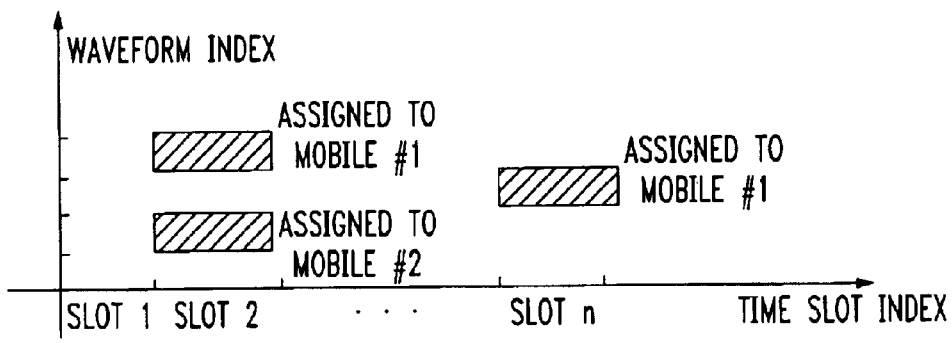
FIG. 3 is a graphical representation illustrating assignment of request (R) segments useful in describing the invention.

FIG. 3 is a graphical representation illustrating assignment of request (R) segments useful in describing the invention. Each mobile unit 102 (FIG. 1) conveys request messages by transmitting them in a predetermined R-segment. To this end, each mobile unit 102 is assigned a sequence of recurring time slots, i.e., a dedicated uplink resource, during which requests can be transmitted. Thus, as shown in FIG. 3, mobile #1 has access to an R-segment in the second time slot and, then, in the $n^{th}$ time slot. In this example, mobile #2 is also shown as having access to an R-segment in the second time slot. Indeed, several mobile units 102 can transmit requests simultaneously by using different waveforms. Typically, only a single mobile unit 102 uses a specific R-segment. This avoids the pitfalls of sending request messages by a random access scheme. It is also noted that the individual mobile units 102 can have different periodicities for the assigned R-segments. The R-segments represent the grant of dedicated uplink resources to mobile units 102 to convey their access requests to base station 101.

Figure 4:
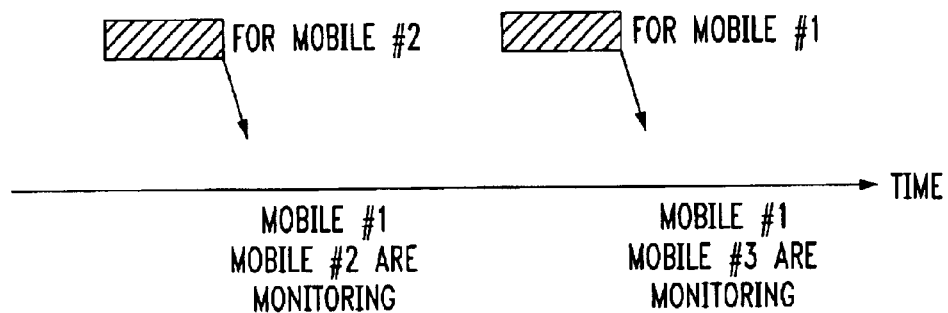
FIG. 4 is a graphical representation illustrating the transmission of pages useful in describing the invention.

FIG. 4 is a graphical representation illustrating the transmission of pages useful in describing the invention. Base station 101 can transmit a page to a mobile unit 102 in an assignment (A) segment. In order to reduce processing in a mobile unit 102 the page messages in A-segments may arrive only in a sequence of recurring A-segments. A mobile unit 102 therefore can monitor only prespecified A-segments, with base station 101 and the mobile unit 102 having an understanding regarding the prespecified A-segments. Thus, as shown in FIG. 4, regarding an A-segment destined for mobile unit #2 both mobile unit #1 and mobile unit #2 are monitoring A-segments, and for an A-segment destined for mobile #1 both Mobile unit #1 and mobile unit #3 are monitoring A-segments.

Figure 5:
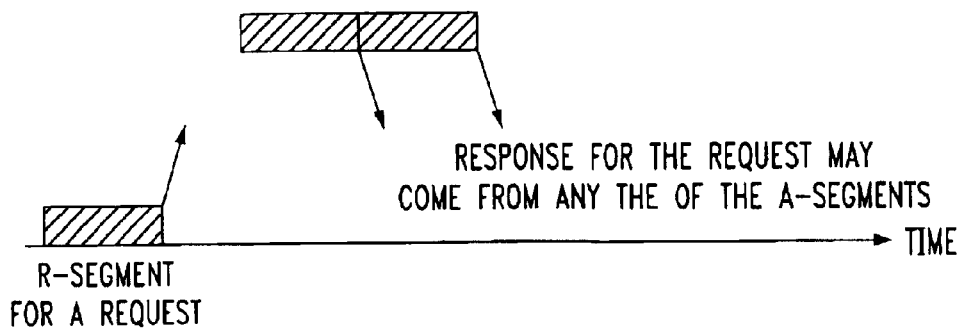
FIG. 5 is a graphical representation illustrating the transmission of request response messages useful in describing the invention.

FIG. 5 is a graphical representation illustrating the transmission of request response messages useful in describing the invention. Base station 101 after detecting a request message from a mobile unit 102 transmits back a request response message in an A-segment. This response message includes the identification of the mobile unit 102 that the request response message is directed to. The mobile unit 102 is monitoring all A-segments received after it had transmitted the request message in order to detect the expected request response message from base station 101. Thus, FIG. 5 shows that after transmitting a request message in an R-segment, a request response message can be received in any of the A-segments.

It is seen that the same A-segments can be used for transmitting both the request response messages and the page messages. This is possible because in many instances both the request response message and the page message lengths are similar. One example being when a request message conveys a request state migration and a request response message grants the state migration requested and the page message is an order by the base station 101 to the mobile unit 102 to migrate to a different state. In such instances both the page and request response messages can be accommodated in the same A-segment. To accommodate messages that are too large to fit in an A-segment, a pointer is placed in the A-segment to indicate the location where the mobile unit 102 can then look up and obtain the remainder of the message. When combining the page and request response messages into a single A-segment the associated type of message, i.e., whether it is a page or a request response message needs to be indicated.

Figure 6:
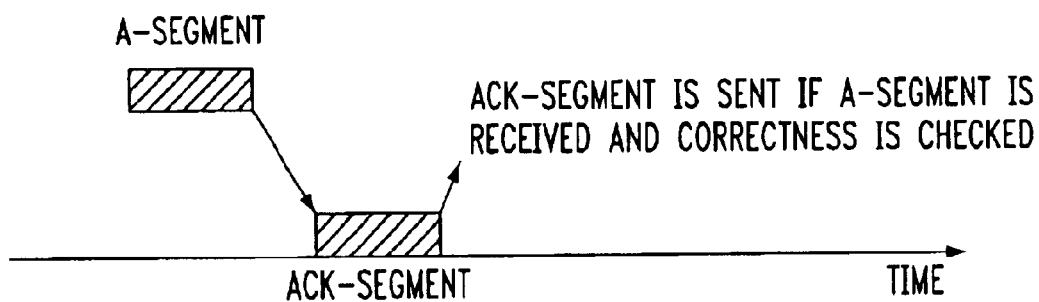
FIG. 6 is a graphical representation illustrating the transmission of acknowledgment segments useful in describing an aspect of the invention.

FIG. 6 is a graphical representation illustrating the transmission of acknowledgment segments useful in describing an aspect of the invention. Note that for each assignment (A) segment there is a corresponding acknowledgment (ACK) segment.

An acknowledgment message is transmitted by a mobile unit 102 as follows:
  (a) when a mobile unit 102 receives a page message; and
  (b) when a mobile unit 102 receives a request response message that is consistent with the original request message.

The purpose of the acknowledgment message is:
  (1) to provide a consistent state transition by both the base station 101 and the mobile unit 102; and
  (2) to eliminate unnecessary state transitions by both the base station 101 and the mobile unit 102, caused by false alarms or misdetections.

Acknowledgment messages could possibly be eliminated if the request messages were made very reliable. However, this would be extremely costly in terms of the time bandwidth resource, because the request segments are a dedicated resource for the mobile units, whereas the acknowledgment segments are a shared resource. On the otherhand, by making the acknowledgment messages very reliable savings are realized in system resources.

Figure 7:
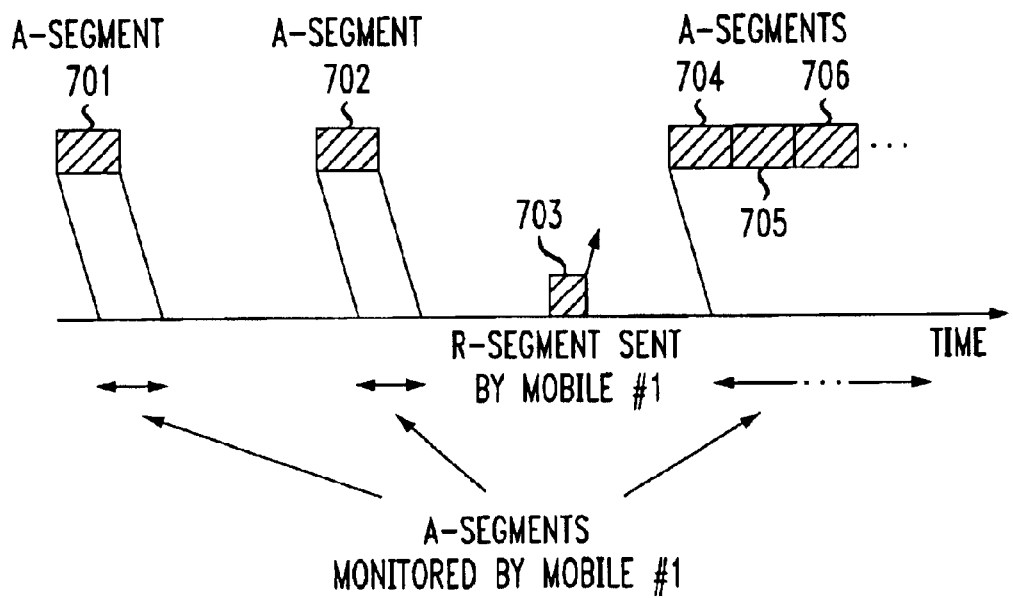
FIG. 7 is a graphical representation illustrating the process for monitoring assignments segments useful in describing the invention.

FIG. 7 is a graphical representation illustrating the process for monitoring assignments segments useful in describing the invention. Specifically, FIG. 7 shows the dynamic behavior of the mobile units 102. A mobile unit 102 generally monitors only its assigned received A-segments for a page message, namely, A-segments 701 and 702. After a mobile unit 102 transmits a request message, it monitors all received A-segments, namely, 704, 705, 706, etc., for a request response message. In practice, a mobile unit 102 might time out after monitoring a predetermined number of A-segments. The logic being that the base station 101 is too busy to service its request. This would save processing power and, hence, extend the battery life of the mobile unit 102.

Figure 8A:
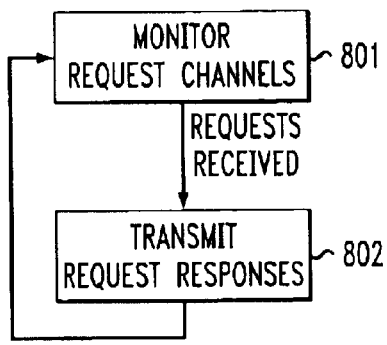
FIGS. 8A and 8B are high level flowcharts illustrating steps of processes employed in a base station and mobile unit in monitoring and transmitting request messages, respectively.
Figure 8B:
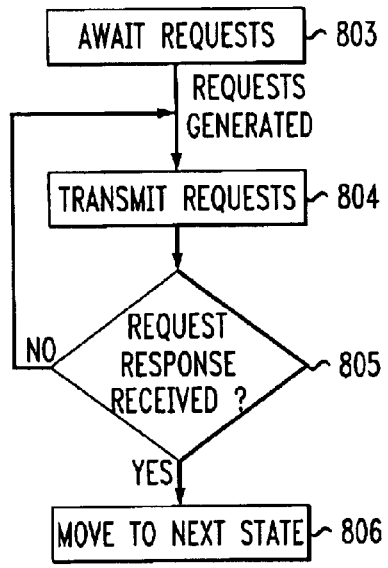

FIGS. 8A and 8B are high level flowcharts illustrating steps of processes employed in a base station and mobile unit in monitoring and transmitting request messages, respectively. Thus, as shown in FIG. 8A, base station 101 in step 801 monitors request channels for incoming request messages and if a request is received from a mobile unit 102 step 802 causes a request response message to be transmitted. Thereafter control is returned to step 801 and steps 801 and 802 are iterated. As shown in FIG. 8B, a mobile unit 102 in step 803 waits for requests to be initiated, i.e., generated. Upon a request being generated, step 804 causes a request message to be transmitted in an R-segment assigned to the mobile unit 102. Then, step 805 tests to determine if a request response message has been received from base station 101. If the test result in step 805 is NO, control is returned to step 804 and steps 804 and 805 are iterated until step 805 yields a YES result. Upon step 805 yielding the YES result, step 806 causes the mobile unit 102 to migrate to a next state.

Figure 9A:
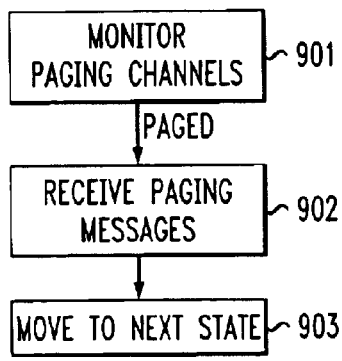
FIGS. 9A and 9B are high level flowcharts illustrating steps in processes employed in a mobile unit and a base station in monitoring and transmitting pages, respectively.
Figure 9B:
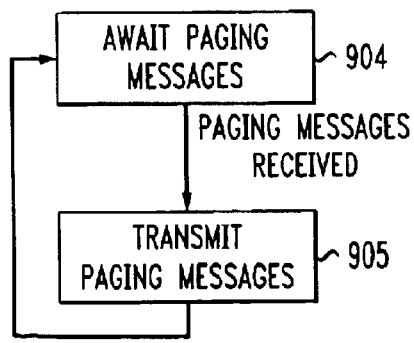

FIGS. 9A and 9B are high level flowcharts illustrating steps in processes employed in a mobile unit and a base station in monitoring and transmitting pages, respectively. Specifically, as shown in FIG. 9A, in step 901 mobile unit 102 monitors paging channels for pages from base station 101. Upon receiving a page message from base station 101 in step 902, step 903 causes mobile unit 102 to migrate to a next state. As shown in FIG. 9B, base station 101 in step 904 waits to obtain paging messages.

Upon receiving a paging message, step 905 causes base station 101 to transmit a page message including the identification of the corresponding mobile unit 102.

Figure 10:
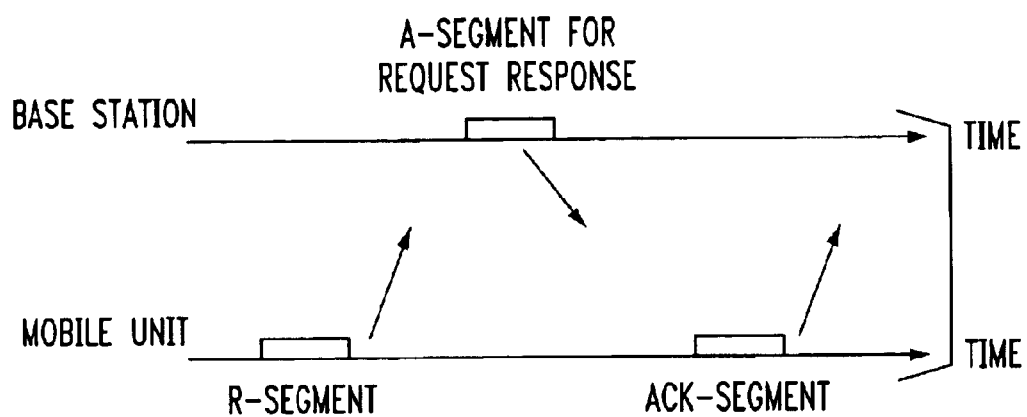
FIG. 10 is a graphical representation illustrating the high level logical flow for a mobile unit initiated request message.

FIG. 10 is a graphical representation illustrating the high level logical flow for a mobile unit 102 initiated request message. A mobile unit 102 transmits a request message in an R-segment conveying a request for a specific service from base station 101. Upon receiving the request, base station 101 transmits a request response message in an appropriate assignment segment, i.e., A-segment. The mobile unit 102 upon receiving the request response message will transmit an acknowledgment message in a specific ACK-segment provided that the request response message satisfies prescribed correctness requirements.

Figure 11:
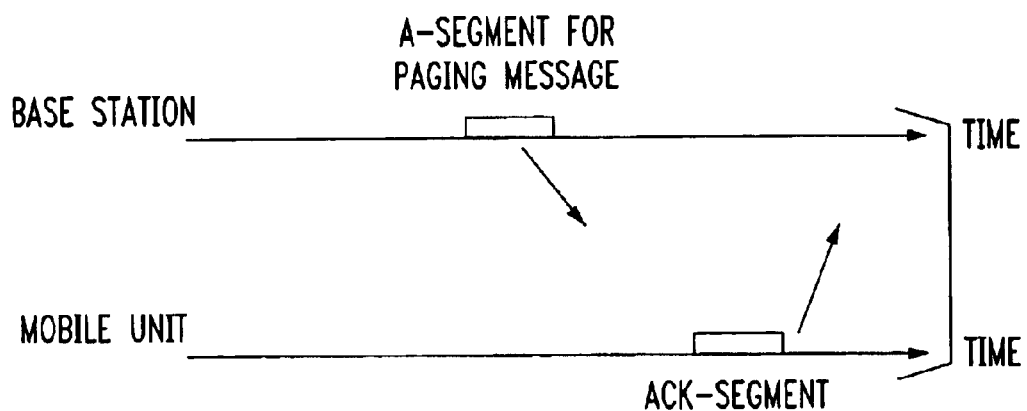
FIG. 11 is a graphical representation illustrating the high level logical flow for a base station initiated paging message.

FIG. 11 is a graphical representation illustrating the high level logical flow for a base station 101 initiated paging message. Base station 101 transmits a page message in an appropriate A-segment. A mobile unit 102 monitors the A-segments and upon receiving the page message transmits an acknowledgment message in a specific ACK-segment provided that the page message satisfies prescribed correctness requirements.

At the outset, it is felt best to define a number of state variables employed in the process illustrated in the flow chart of FIG. 12, and also in the process illustrated by the flowchart of FIG. 13, described below. The variables X and Y are maintained by the base station 101 and are used to set the appropriate fields in the page and request response messages. There are a significant number of different kinds of page and request messages and they can be thought as belonging to different classes. The page messages could be of "n" different classes and request messages could be of "m" different classes. DR and DP are internal state variables maintained by base station 101 and take on "m" and "n" values, respectively, to indicate the message class. Y indicates whether the message is a page or request response message and can be thought of as taking values P or R, respectively. X indicates the message class. The variables X and Y are functions of DP and DR. One specific function of particular interest is: after defining the priority or relative importance of all the (m+n) message classes the variables X and Y are defined as follows $X = \max(DR, DP)$ $Y = P$ if $DP > DR$ $Y = R$ otherwise.

By way of an example, consider the situation of m=2 and n=3; let rc1 and rc2 be the message classes for request messages; let pc1, pc2 and pc3 be the message classes for page messages. Then, if the request and page messages have the following priorities $0 < rc1 < pc1 < rc2 < pc2 < pc3$, the above functions for X and Y result in the following tables:

| | | DP | | |
|---|---|---|---|---|
| DR | 0 | pc1 | pc2 | pc3 |
| | | X | | |
| 0 | 0 | pc1 | pc2 | pc3 |
| rc1 | rc1 | pc1 | pc2 | pc3 |
| rc2 | rc2 | rc2 | pc2 | pc3 |
| | | Y | | |
| 0 | 0 | P | P | P |
| rc1 | R | P | P | P |
| rc2 | R | R | P | P |

Figure 12:
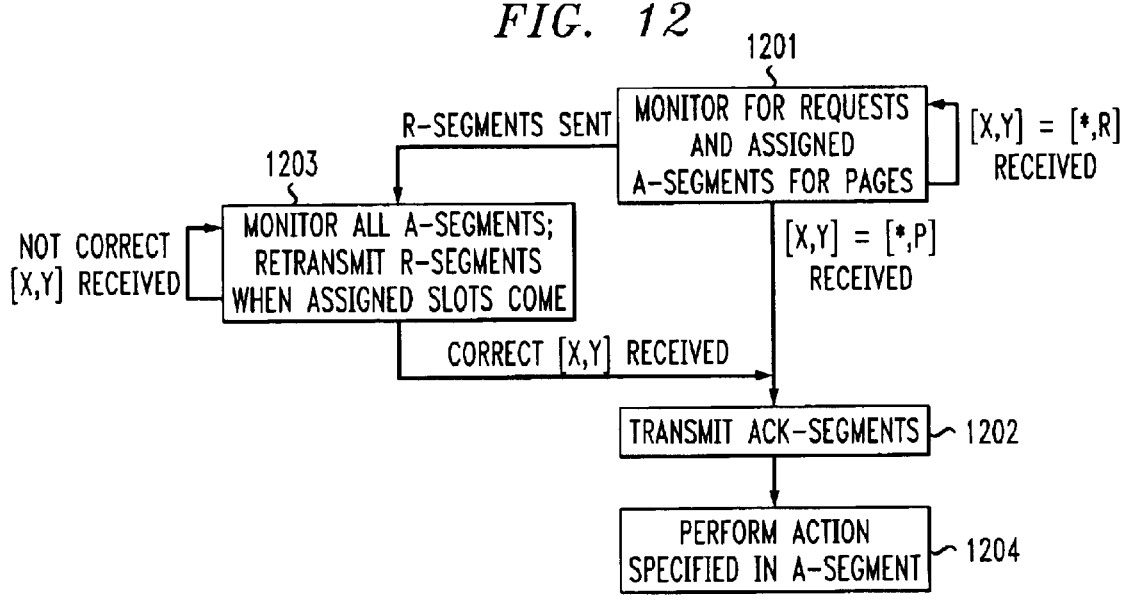
FIG. 12 is a state diagram illustrating steps in a unified process employed in a mobile unit for initiating request messages and monitoring paging messages in accordance with the invention.

FIG. 12 is a state diagram illustrating steps in a unified process employed in a mobile unit 102 for initiating request messages and monitoring paging messages in accordance with the invention. In state 1201 the mobile unit 102 monitors for access requests and assigned A-segments for a received page, as shown in FIG. 7 and described above. Upon receiving a page, i.e., variable Y=P, state 1202 is entered and a corresponding ACK-segment including an appropriate acknowledgment message is transmitted to base station 101. Thereafter, state 1204 causes mobile unit 102 to perform the action indicated in the received A-segment. Returning to state 1201, if an access request is detected, i.e., variable Y=R, a request message is transmitted to base station 101 in an R-segment assigned to this particular mobile unit 102 and state 1203 is entered. In state 1203 mobile unit 102 is caused to monitor all A-segments for a request response message from base station 101. If an appropriate request response message is not received in one of a prescribed number of A-segments, mobile unit 102 is caused to return to state 1201. That is, mobile unit 102 has timed out and retransmission of the R-segment including the request message is terminated. When mobile unit 102 receives a request response message including [X,Y] it checks for its correctness. One example of a correctness definition is that [X,Y] is correct if Y=R and X is consistent with the original transmitted request message. If an appropriate request response message is not received, the R-segment is retransmitted in the assigned time slots until timing out of mobile unit 102 occurs. Upon a correct [X,Y] being received in state 1203, mobile unit 102 enters state 1202 and an ACK-segment including an appropriate acknowledgment message is transmitted to base station 102. Thereafter, state 1204 is entered and mobile unit 102 is causes to perform the action specified in the received A-segment.

Figure 13:
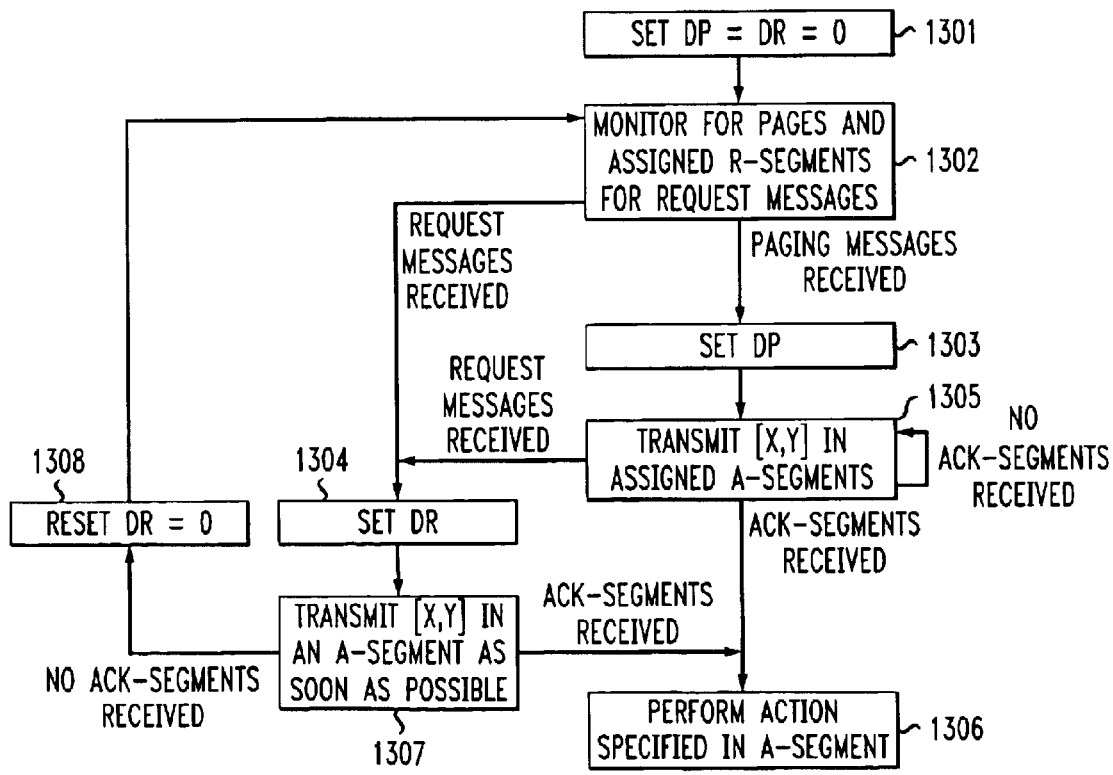
FIG. 13 is a state diagram illustrating steps in a unified process employed in a base station for initiating paging messages and monitoring request messages in accordance with the invention.

FIG. 13 is a state diagram illustrating steps in a unified process employed in a base station 101 for initiating paging messages and monitoring request messages in accordance with the invention. In state 1301, state variables DP and DR are set to zero (0). Then, in state 1302 base station 101 monitors for indications of paging messages and assigned R-segments for received request messages. If a page message is detected state 1303 sets DP to a "n" value to indicate the page message class. State 1305 causes base station 101 to transmit the page message in an assigned A-segment to mobile unit 102. If in state 1305 a request message is received state 1304 is immediately entered. This is important to minimize any delay in providing access to a requesting mobile unit 102. Returning to state 1305, if no ACK-segment is received the page message is again transmitted in the assigned A-segment. If an ACK-segment is received including an appropriate acknowledgment message state 1306 is entered and base station 101 is caused to perform the action specified in the ACK-segment message. Returning to state 1302, if a request message is received in an assigned R-segment, state 1304 is entered and state variable DR is set to a "m" value indicating its class. Then, state 1307 transmits a request response message in an A-segment as soon as possible. Again, this is to insure that any delay is minimized in providing access to a requesting mobile unit 102. If no ACK-segment is received including an appropriate acknowledgment message state 1308 sets DR back to zero (0) and state 1302 is reentered. If an appropriate acknowledgment message is received in an ACK-segment, state 1306 causes base station 101 to perform the action specified in the request response message in the A-segment.

It should be noted that actions performed by mobile unit 102 and base station 101 in states 1204 and 1306, respectively, are consistent.

The above-described embodiments are, of course, merely illustrative of the principles of the invention. Indeed, numerous other methods or apparatus may be devised by those skilled in the art without departing from the spirit and scope of the invention.

What is claimed is:

1. A method for use in a wireless communications mobile unit comprising the steps of:

monitoring for an access request;

monitoring an assigned resource for received page messages;

determining whether an access request and/or a received page message has been detected;

if an access request is detected, wherein processing of said access requests takes precedence over processing of said received pages, transmitting a request message to a base station on a resource dedicated to this mobile unit;

monitoring for received request response messages;

if a request response message is received, controllably transmitting an acknowledgment indicating reception of the request response message; and if a page message is detected, transmitting an acknowledgment indicating reception of the page message, whereby latency is minimized in gaining access by said mobile unit from said base station.

2. The method as defined in claim 1 wherein said step of monitoring for page messages and said step of monitoring for an access request are performed substantially simultaneously.

3. The method as defined in claim 1 further including a step of performing action indicated in said received page message.

4. The method as defined in claim 1 wherein said step of transmitting said request message includes a step of generating and transmitting said request message substantially immediately.

5. The method as defined in claim 1 wherein said step of controllably transmitting includes a step of determining the correctness of a received request response message.

6. The method as defined in claim 5 wherein said step of determining the correctness includes a step of determining if said received request response message is consistent with said transmitted request message and a step of transmitting said acknowledgment when said received request response message is consistent with said transmitted request message.

7. The method as defined in claim 6 further including a step of performing action indicated in a received request response message.

8. The invention as defined in claim 1 wherein said resource is a segment.

9. The method as defined in claim 8 wherein said step of monitoring for page messages includes a step of monitoring assignment segments assigned to this mobile unit.

10. The method as defined in claim 9 wherein said request response messages are received in assignment segments and said step of monitoring for request response messages includes a step of monitoring all of received assignment segments.

11. The method as defined in claim 10 wherein individual ones of said received assignment segments include a request response messages and a page message.

12. A method for use in a wireless communications base station comprising the steps of:

monitoring for pages;

monitoring for request messages;

determining whether a request message and/or a page has been detected;

if a page is detected, transmitting a page message in an assigned resource;

determining if an acknowledgment has been received indicating that the page message was received by a mobile unit;

if a request message has been received, substantially immediately transmitting a request response message in a prescribed resource, wherein processing of said received request messages takes precedence over processing of said pages; and determining if an acknowledgment has been received indicating that the request response message was received by a mobile unit, whereby latency in providing a mobile unit with access is minimized.

13. The method as defined in claim 12 wherein said step of monitoring for pages and said step of monitoring for request messages are performed substantially simultaneously.

14. The method as defined in claim 12 further including a step of performing action indicated in said received request message.

15. The method as defined in claim 12 further including a step of performing action indicated in said page message.

16. The method as defined in claim 12 wherein said resource is a segment.

17. The method as defined in claim 16 wherein said step of transmitting said request response message includes a step of transmitting said request response message in an assignment segment.

18. The method as defined in claim 12 wherein said transmitted messages include message indicators indicating a class of message and a type of message.

19. The method as defined in claim 18 wherein said request response message includes one of said indicators including an indication that the received message was a request and an indication of the message class.

20. The method as defined in claim 18 wherein said page message includes one of said indicators including an indication that the message being transmitted is a page and an indication of the message class.

21. A method for use in a wireless communication system comprising the steps of:

in a mobile unit,
monitoring for an access request,
monitoring an assigned resource for page messages,
determining whether an access request and/or a page message has been detected;
if an access request is detected, transmitting a request message on a resource dedicated to this mobile unit,
monitoring for received request response messages,
if a request response message is received, controllably transmitting an acknowledgment indicating reception of the request response message, and
if a page message is detected, transmitting an acknowledgment indicating reception of the page message; and
in a base station,
monitoring for pages,
monitoring for request messages,
determining whether a request message and/or a page has been detected,
if a page is detected, transmitting a page message in an assigned resource,
determining if an acknowledgment has been received indicating that the page message was received by a mobile unit,
if a request message has been received, substantially immediately transmitting a request response message in a prescribed resource, and
determining if an acknowledgment has been received indicating that the request response message was received by a mobile unit;
wherein in said mobile unit, processing of said requests takes precedence over processing of said received page messages, and in said base station, processing of said received request messages takes precedence over processing of said pages
whereby latency is minimized in providing access to said mobile unit.

22. The method as defined in claim 21 wherein said step of monitoring for page messages and said step of monitoring for an access request in said mobile unit are performed substantially simultaneously.

23. Tee method as defined in claim 21 wherein said step of monitoring for pages and said step of monitoring for request messages in said base station are performed substantially simultaneously.

24. The method as defined in claim 21 wherein said step of transmitting said request message includes the steps of generating and transmitting substantially immediately said request message.

25. The method as defined in claim 21 wherein said step of controllably transmitting includes a step of determining the correctness of a received request response message.

26. The method as defined in claim 21 wherein said resource is a segment.

27. The method as defined in claim 26 wherein said step of monitoring for page messages includes a step of monitoring assignment segments assigned to this mobile unit.

28. The method as defined in claim 26 wherein said step of transmitting said request response message includes a step of transmitting said request response message in an assignment segment.

29. The method as defined in claim 26 wherein said request response messages are received in assignment segments and said step of monitoring for request response messages includes a step of monitoring all of received assignment segments.

30. The method as defined in claim 29 wherein individual ones of said received assignment segments include a request response messages and a page message.

31. The method as defined in claim 26 wherein in said base station said step of transmitting said request response message includes a step of transmitting said request response message in assignment.

32. The method as defined in claim 21 wherein in said base station said transmitted messages include message indicators indicating a class of message and a type of message.

33. The method as defined in claim 32 wherein said request response message includes one of said indicators including an indication that the received message was a request and an indication of the message class.

34. The method as defined in claim 32 wherein said page message includes one of said indicators including an indication that the message being transmitted is a page and an indication of the message class.

35. Apparatus for use in a wireless communications mobile unit comprising:

a controllable receiver;
a controllable transmitter;
a controller;
said controllable receiver including a monitor for monitoring received signals to detect access requests, for monitoring an assigned resource in said received signals to detect received page messages and for monitoring said received signals to detect received request response messages;
said controller determining whether an access request and/or a page message has been detected;
said controller being responsive to an indication that an access request has been detected for controlling said controllable transmitter to transmit a request message on a resource dedicated to this mobile unit;
said controller being responsive to an indication that a request response message has been received for controlling said controllable transmitter to transmit an acknowledgment indicating reception of the request response message; and
said controller being responsive to an indication that a page message has been detected for controlling said controllable transmitter to transmit an acknowledgment indicating reception of the page message, wherein said controller controls said mobile unit so that processing of said access requests takes precedence over processing of said received page messages, whereby latency is minimized in gaining access to a base station.

36. The apparatus as defined in claim 35 wherein said monitor monitors for page messages and for access requests substantially simultaneously.

37. The apparatus as defined in claim 35 wherein said controller controls said mobile unit to perform action indicated in said received page message.

38. The apparatus as defined in claim 35 wherein said controller determines the correctness of a received request response message.

39. The apparatus as defined in claim 38 wherein said controller in determining correctness determines if said received request response message is consistent with said transmitted request message and wherein said controllable transmitter is controlled by said controller to transmit said acknowledgment when said received request response message is consistent with said transmitted request message.

40. The apparatus as defined in claim 39 wherein said controller controls said mobile unit to perform action indicated in a received request response message.

41. The apparatus as defined in claim 35 wherein said resource is a segment.

42. The apparatus as defined in claim 41 wherein said monitor in monitoring for said page messages monitors assignment segments.

43. The apparatus as defined in claim 42 wherein said request response messages are received in assignment segments and said monitor in monitoring for request response messages monitors all of received assignment segments.

44. The apparatus as defined in claim 43 wherein individual ones of said received assignment segments include a request response messages and a page message.

45. Apparatus for use in a wireless communications base station comprising:

a controllable receiver;

a controllable transmitter;

a controller;

said controllable receiver including a monitor for monitoring received signals to detect pages and for monitoring said received signals to detect request messages;

said controller determining whether a request message and/or a page has been detected;

said controller being responsive to an indication that a page has been detected for controlling said controllable transmitter to transmit a page message in an assigned resource;

said monitor monitoring for a received acknowledgment indicating that the page message was received by a mobile unit;

said controller being responsive to an indication that a request message has been received for controlling said controllable transmitter to substantially immediately transmit a request response message in a prescribed resource, wherein controller controls said base station so that processing of said request messages takes precedence over Processing of said pages; and said monitor monitoring for a received acknowledgment indicating that the request response message was received by a mobile unit, whereby latency is minimized in providing access to said mobile unit.

46. The apparatus as defined in claim 45 wherein said monitor monitors for pages and for request messages substantially simultaneously.

47. The apparatus as defined in claim 45 wherein said controller controls said base station to perform action indicated in said received request message.

48. The apparatus as defined in claim 45 wherein said controller controls said base station to perform action indicated in said page message.

49. The apparatus as defined in claim 45 wherein said resource is a segment.

50. The apparatus as defined in claim 49 wherein said controller controls said controllable transmitter to transmit said request response message in an assignment segment.

51. The apparatus as defined in claim 45 wherein said transmitted messages include message indicators indicating a class of message and a type of message.

52. The apparatus as defined in claim 51 wherein said request response message includes one of said indicators including an indication that the received message was a request and an indication of the message class.

53. The apparatus as defined in claim 51 wherein said page message includes one of said indicators including an indication that the message being transmitted is a page and an indication of the message class.

54. Apparatus for use in a wireless communication system:

in a mobile unit, a first controllable receiver, a first controllable transmitter, a first controller, said first controllable receiver including a first monitor for monitoring received signals to detect access requests, for monitoring an assigned resource in said received signals to detect received messages and for monitoring said received signals to detect received request response messages, said first controller determining whether an access request and/or a page message has been detected;

said first controller being responsive to an indication that an access request has been detected for controlling said first controllable transmitter to transmit a request message on a resource dedicated to this mobile unit, said first controller being responsive to an indication that a request response message has been received for controlling said first controllable transmitter to transmit an acknowledgment indicating reception of the request response message, and said first controller being responsive to an indication that a page message has been detected for controlling said first controllable transmitter to transmit an acknowledgment indicating reception of the page message; and in a base station, a second controllable receiver, a second controllable transmitter, a second controller, said second controllable receiver including a second monitor for monitoring received signals to detect pages and for monitoring said received signals to detect request messages, said second controller determining whether a request message and/or a page has been detected, said second controller being responsive to an indication that a page has been detected for controlling said controllable transmitter to transmit a page message in an assigned resource, said second monitor monitoring for a received acknowledgment indicating that the page message was received by a mobile unit, said second controller being responsive to an indication that a request message has been received for controlling said second controllable transmitter to substantially immediately transmit a request response message in a prescribed resource, and said second monitor monitoring for a received acknowledgment indicating that the request response message was received by a mobile unit;

wherein said first controller controls said mobile unit so that processing of said requests takes precedence over processing of said received page messages, and wherein said second controller controls said base station so that processing of said received request messages takes precedence over processing of said pages, whereby latency is minimized in providing access to said mobile unit.

55. The apparatus as defined in claim 54 wherein said first monitor monitors for page messages and for access requests in said mobile unit substantially simultaneously.

56. The apparatus as defined in claim 54 wherein said second monitor monitors for pages and for request messages in said base station substantially simultaneously.

57. The apparatus as defined in claim 54 wherein said first controller determines the correctness of a received request response message in said mobile unit.

58. The apparatus as defined in claim 54 wherein said resource is a segment.

59. The apparatus as defined in claim 58 wherein said first monitor in monitoring for said page messages monitors assignment segments.

60. The apparatus as defined in claim 58 wherein said second controller controls said second controllable transmitter to transmit said request response message in an assignment segment.

61. The apparatus as defined in claim 58 wherein said first receiver receives said request response messages in assignment segments and said first monitor in monitoring for request response messages monitors all of said received assignment segments.

62. The apparatus as defined in claim 61 wherein individual ones of said received assignment segments include a request response messages and a page message.

63. The apparatus as defined in claim 54 wherein said messages transmitted by said second transmitter include message indicators indicating a class of message and a type of message.

64. The apparatus as defined in claim 63 wherein said request response message includes one of said indicators including an indication that the received message was a request and an indication of the message class.

65. The apparatus as defined in claim 63 wherein said page message includes one of said indicators including an indication that the message being transmitted is a page and an indication of the message class.

* * * * *